(12) United States Patent
Farquharson et al.

(10) Patent No.: US 9,106,112 B2
(45) Date of Patent: Aug. 11, 2015

(54) SOLAR SUNMILL GENERATOR BULB

(71) Applicants: Aston Gustavous Farquharson, Stormville, NY (US); Victor Roland Vargas Mousaa, Beacon, NY (US)

(72) Inventors: Aston Gustavous Farquharson, Stormville, NY (US); Victor Roland Vargas Mousaa, Beacon, NY (US)

(73) Assignee: NuSpecies Global Machines Corporation, Stormville, NY (US)

( * ) Notice: Subject to any disclaimer, the term of this patent is extended or adjusted under 35 U.S.C. 154(b) by 49 days.

(21) Appl. No.: 13/900,826

(22) Filed: May 23, 2013

(65) Prior Publication Data

US 2014/0159377 A1    Jun. 12, 2014

Related U.S. Application Data

(60) Provisional application No. 61/735,770, filed on Dec. 11, 2012, provisional application No. 61/819,040, filed on May 3, 2013.

(51) Int. Cl.
*H02K 7/18* (2006.01)
*H02K 7/09* (2006.01)
*F03D 3/06* (2006.01)
*H02K 21/26* (2006.01)

(52) U.S. Cl.
CPC .............. *H02K 7/1807* (2013.01); *F03D 3/061* (2013.01); *H02K 7/09* (2013.01); *H02K 7/183* (2013.01); *F05B 2220/7068* (2013.01); *H02K 21/26* (2013.01); *Y02E 10/721* (2013.01); *Y02E 10/74* (2013.01)

(58) Field of Classification Search
CPC ..... H02K 7/1807; H02K 21/26; H02K 7/183; H02K 7/09; Y02E 10/46; Y02E 10/721; Y02E 10/74; F03G 6/00; F03G 7/00; F03D 3/061; F05B 2220/7068
USPC ....... 290/1 A, 1 R; 60/641.8, 641.11, 641.12; 320/101; 318/117; 323/906; 126/569, 126/604; 356/216
See application file for complete search history.

(56) References Cited

U.S. PATENT DOCUMENTS

| | | | | |
|---|---|---|---|---|
| 4,353,003 | A * | 10/1982 | Sommers | 310/306 |
| 4,397,150 | A * | 8/1983 | Paller | 60/641.8 |
| 4,410,805 | A * | 10/1983 | Berley | 290/1 R |
| 2006/0000215 | A1* | 1/2006 | Kremen et al. | 60/721 |
| 2012/0204564 | A1* | 8/2012 | Battaglia | 60/641.8 |

FOREIGN PATENT DOCUMENTS

WO    WO 2010112685 A2 * 10/2010
WO    WO 2011044144 A1 *  4/2011

* cited by examiner

*Primary Examiner* — Pedro J Cuevas
*Assistant Examiner* — Viet Nguyen
(74) *Attorney, Agent, or Firm* — Keohane & D'Alessandro PLLC; Madeline F. Schiesser

(57) ABSTRACT

An electric radiometer generates electricity in tangible amounts by placing stationary rare earth magnets on a stationary magnetized needle which are connected to two-sided aluminum wings in such a manner that an electric current is produced when the coils in motion cut across the flux lines of a stationary magnetic field after a complete revolving circuit to a receiving device.

11 Claims, 4 Drawing Sheets

SOLAR SUNMILL GENERATOR BULB

CROSS REFERENCE TO RELATED APPLICATIONS

This application claims priority to U.S. Provisional Patent Application No. 61/735,770, filed Dec. 11, 2012 and U.S. Provisional Patent Application No. 61/819,040, filed May 3, 2013. The aforementioned provisional patent applications are hereby incorporated by reference in their entirety. In addition, this application is related in some aspects to commonly-owned and co-pending application Ser. No. 13/900,851, entitled "WINDMILL GENERATOR", filed on May 23, 2013, the entire contents of which are herein incorporated by reference.

FIELD OF THE INVENTION

The present invention relates to a method and apparatus for generating electricity, and more particularly, to a method and apparatus for generating electricity from solar energy.

BACKGROUND OF THE INVENTION

The radiometer has been regarded since the 19$^{th}$ Century as a scientific novelty. Invented by Sir William Crooks, the radiometer generally consists of a set of vanes contained within a glass bulb. When forms of light (photons) hit the vanes, the radiation effect on the vanes causes them to move. This means that if the vanes are mounted between two needles, the vanes will rotate. This effect is attributed to light or radiation particles hitting a polished side of the vanes, which are contained within a partial vacuum.

Various modern versions of the radiometer include the Nichols radiometer and other microwave and gas radiometers. However, much of the same principles are involved as radiation, gas or light slams into specific sides of the vanes to cause them to rotate. Other variations include having the vanes absorb radiation so as to detect levels of radiation in the specific environment or scenario. But it should be noted that the principles of the radiometer tend to relate to low level scientific testing or novelty.

SUMMARY OF THE INVENTION

In the preferred embodiment, like the inside of a Shurite amp meter, a magnet with its magnetic force is positioned in the middle of a rectangular framed loop/solenoid coil which is placed on a magnetized needle of the magnet to balance the loop/solenoid coil. The wings or vanes can be made of aluminum, plastic, metals, or cardboard in a variety of shapes. The wings or vanes are coupled to the loop/solenoid coil to induce motion in the coil from the radiation effect of the light within the glass vacuum bulb. Light is emanating from the sun or other artificial source strikes the white and black aluminum wings, causing them to rotate. This ultimately causes the production of electric currents.

A first aspect of the present invention provides a solar generator, having a clear bulb encasement configured and disposed to maintain a partial vacuum therewithin, the bulb encasement having a first magnet and a second magnet, and a needle embedded within the second magnet, the needle balancing the second magnet within a coil frame armature, the coil frame armature comprising a frame around which coil is wrapped in such a way as to, when the armature spins in response to light hitting wings attached to the frame, the coil cuts through a magnetic field between the first and second magnets, thereby generating electricity.

A second aspect of the present invention provides a solar generator having a bulb encasement configured and disposed to maintain a partial vacuum therewithin, the bulb encasement having a magnet, and a needle extending from a top side to a bottom side of a coil frame armature, the coil frame armature comprising a frame around which coil is wrapped in such a way as to, when the armature spins in response to light hitting wings attached to the frame, cut through magnetic flux lines of the magnet, thereby generating electricity.

BRIEF DESCRIPTION OF THE DRAWINGS

These and other features of this invention will be more readily understood from the following detailed description of the various aspects of the invention taken in conjunction with the accompanying drawings in which.

Figure 1:
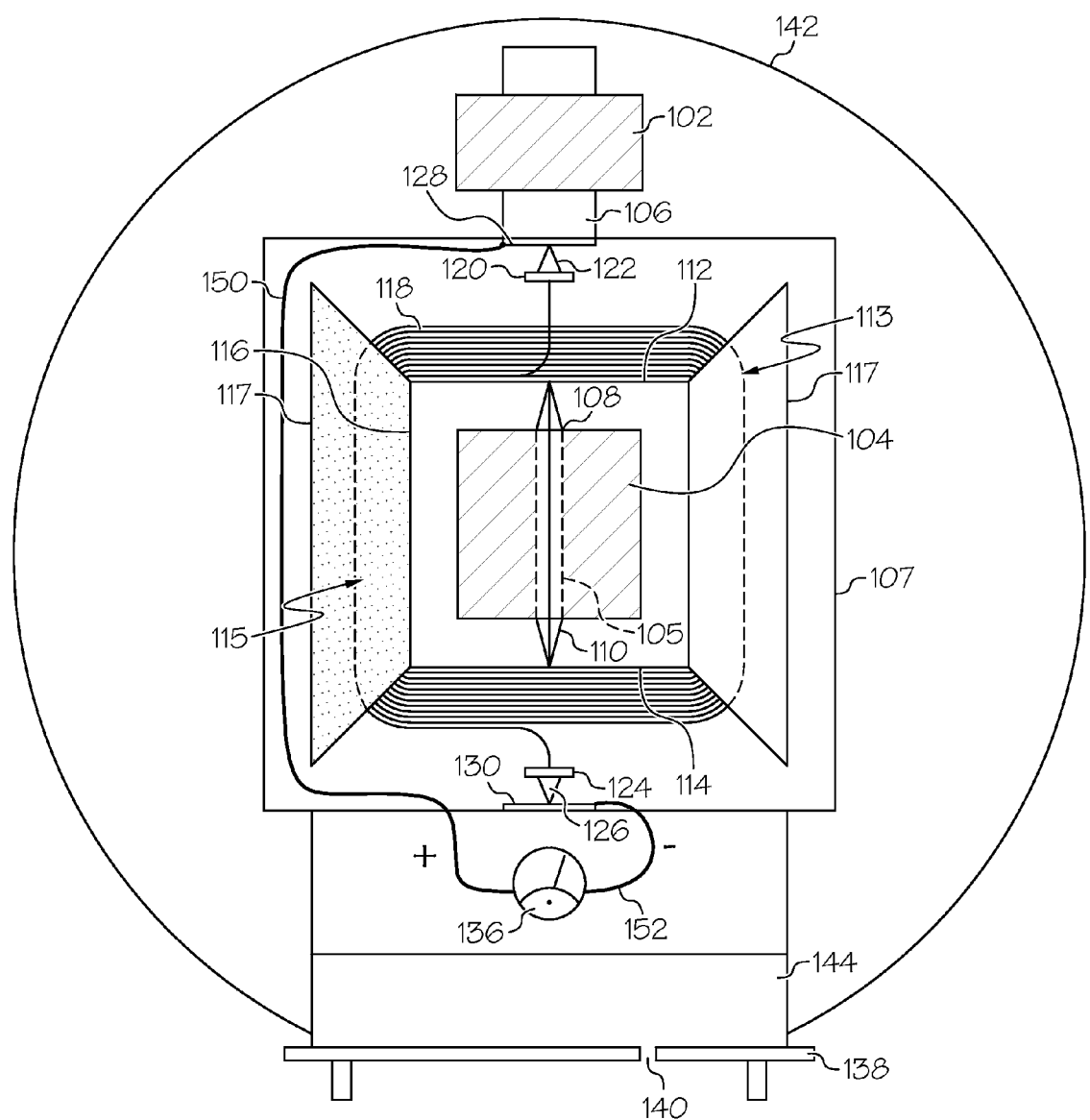
FIG. 1 is a front view of an embodiment of the present invention comprising two magnets.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language, means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

Embodiments of the present invention can relate to a method and apparatus for generating electricity by a coil of any size, or other electrical materials, in notion and also any magnet of any size, shape, material, etc. When vacuum round bulb (typically, but not limited to glass) is heated from the heated source to a certain degree, with the help of a convex magnifying glass, the few molecules within the round vacuum glass bulb can push the black carbon wings and white shining aluminum wings connected to the aluminum armature overcoming the light feather weight loop/solenoid coil suspended on a stationary magnetized needle surrounding the stationary magnet inside its loop/solenoid coil.

Embodiments of the present invention provide a method and apparatus for creating electricity on a tangible scale. In one embodiment, like inside a Shurite amp meter, a magnet with its magnetic force is positioned substantially in the middle of a rectangular loop/solenoid coil wrapped around a frame, which is placed on a magnetized needle of the magnet to balance the frame. Another magnet is placed above the coil. In another embodiment, only the magnet above the coil is used, i.e., no magnet is placed within the frame. The aluminum wings, or vanes, are situated at the interfaces of sides of the frame. A glass bulb encasement is used in embodiments of the present invention. When light emanating from the sun or other artificial light source strikes the white and black aluminum wings, atoms will become heated within about 99 percent of the interior of the glass bulb, and the loop is caused to rotate at a constant 360 degrees through flux lines of the magnet(s), where ultimately electric currents will be produced. When magnetic flux lines are crossed by the loop/solenoid coil in motion due to a light source, an electric current is produced.

Figure 2:
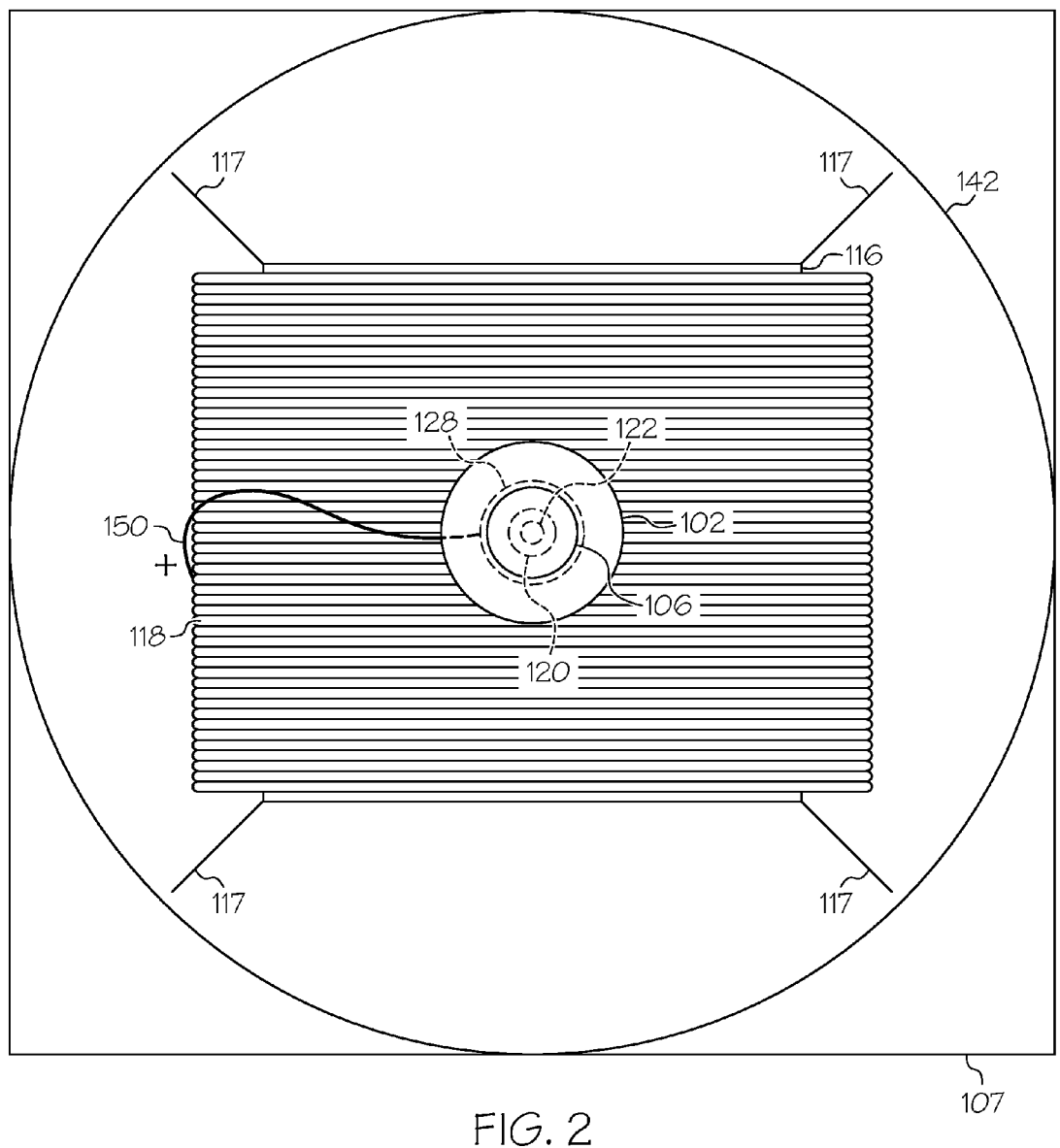
FIG. 2 is a top view of the preferred embodiment of the present invention.
Figure 3:
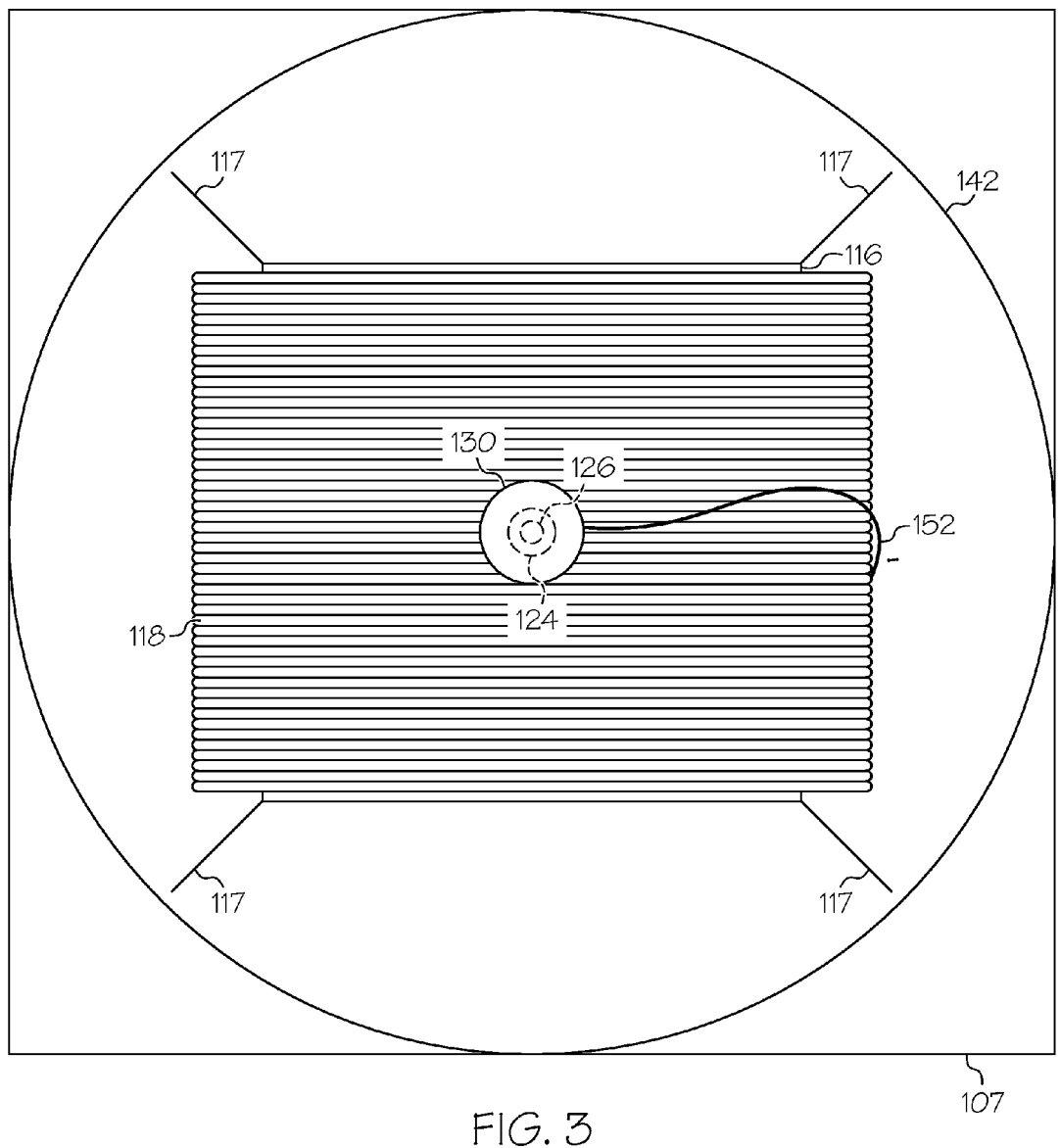
FIG. 3 is a bottom view of the present invention without the base, stand or meter (shown this way for clarity).

Referring now to FIGS. 1-3, there is a first magnet and second magnet. In some embodiments, the first and second magnets are rare earth magnets. A first magnet 102 is positioned above the second magnet 104. The magnetic field of the first magnet 102 holds the second magnet 104 in place. The magnets remain stationary. The first magnet 102 is situated on a holding device, for example, an insulated pole 106. It will be recognized that the magnet 102 can be situated atop any apparatus that holds it in place. The pole 106 is engaged to an insulated plastic frame 107, which houses the coil frame armature, discussed further herein. The second magnet 104 is of a round shape on the horizontal axis. Pole 106 keeps the magnets 102 (above) and 104 (below) a predetermined distance from each other. The distance is based on the size of the magnets. Magnet 104 begins to float mid-air when spaced 2¾ inches from magnet 102 when a size of the magnets 104, 102 is 1½ inches in circumference and a thickness of ¼ inch. In some embodiments, the magnets 102 and 104 are the same size, and in other embodiments, the magnets 102 and 104 are different sizes from one another. Pole 106 keeps the magnet 104 (below) floating in mid-air from the attractional field of magnet 102, so that the coil 118 keeps as light as a feather. And also, keeps magnet 104 (below) "stationary."

Embedded within the second magnet 104 is a stationary needle 105. A first end 108 of the needle 105 and a second end 110 of the needle 105 engage with an indentation in a first aluminum plate 112 and a second aluminum plate 114. The aluminum plates form a top and bottom side of a coil frame armature 116. Four aluminum wings 117 are attached to corners of the coil frame armature 116. Coil wire 118 is wrapped around frame 116 in such a way that it cuts across the magnetic field. In a preferred embodiment, the coil 118 is of a rectangular or square shape around the armature 116.

A first end 120 of coil wire 118 (also referred to herein as "loop") engages with a first pinpoint needle 122 and a second end 124 of coil wire 118 engages with a second pin point needle 126. The engagement may be through insulated glue. Pin point needles 122 and 126 engage with indentations of a first copper plate 128 and second copper plate 130, respectively. The first copper plate 128 is situated at the top of frame 107, and second copper plate 130 is situated at the bottom of frame 107. This in turn will be balancing and rotating the aluminum wing frame (having the coil wound around thereon) when the natural/artificial light source is striking.

The winding copper coil 118, is attached to the frame 107, which will be connected to right side up and upside down pin point brush needles (122 and 126), which will be rotating, touching both the positive wire 150 and negative wire 152 causing the electron flow to create an electric current. It should be noted that there is little resistance from frictional force, except from the rare earth magnets 102, 104 which is stationary above and below the point of the stationary magnetic needle 105 on the base 144 of the insulated plastic stand 138. The first and second wire attach to meter 136 to indicate, for example, the amount of electricity being generated.

Bulb 142 is situated over the frame 107 onto the stand 138. Bulb 142 is typically clear, or configured in such a way as to allow light to pass therethrough. In some embodiments, glass bulb 142 is situated on an insulated, e.g., plastic, stand 138. A vacuum hole 140 is formed in the stand 138, particularly when a clear glass bulb 142 is used to enclose the various moveable elements. The vacuum hole allows air to be drained from the glass bulb 142, creating a partial vacuum. In some embodiments, the partial vacuum may be in the range of about 5 torr to about 0.01 torr. Although the bulb 142 is referred to herein as "glass", the bulb may be made of any suitable material in other embodiments, and the invention is not meant to be limited.

The shining aluminum wings 117 have a shiny aluminum side 113 and the other, a coated black graphite/carbon side 115. One side of each wing may be one color such as white, while the other side of each wing may be the opposite color, such as black. It should be recognized that in alternative embodiments, more or fewer wings than four can be applied to the coil frame armature.

The present invention also comprises a receiving device. In the example embodiment chosen for the purpose of disclosure, the receiving device is a micro/milliamp meter (also referred to herein as "scale") 136. The scale 136 in this example is merely as an example relating to the fact that an electric current is generated through embodiments of the present invention. The scale 136 may also be referred to or regarded herein as a receiving device that ultimately makes use of the electric current generated.

The aluminum wings 117 are formed such that they are capable of revolving seamlessly via their connection to the coil frame armature, which is balanced on the magnetic needle 105. When light heats atoms near the aluminum wings 117, the heated atoms reflect off of the front sides 113 of the wings 117 and bounces or otherwise absorb off the rear sides 115) of the wings 117. At the same time, magnetic lines of force are formed as the magnets 102, and 104 remain stationary. In this aspect, an electric current is produced when the coil 118 completes circuit to the scale 136.

An embodiment of the present invention comprises coils 118 which are made of copper to produce electricity. Copper wire is a good conductor of electricity when in motion rotating around a magnet. According to Faraday's law, electricity is produced whenever magnetic lines of force between stationary magnets 102, 104 cuts across the copper loop wire 118 which in motion, which is part of a complete circuit.

The winding copper coils 118 in the embodiments are formed by winding a long copper wire in the shape of a spiral. The copper coils 118 in fact act like a magnet when the current is turned on. What happens is that the copper coil 118 possesses similar magnetic lines of force around it as an ordinary magnet does. As mentioned above, whenever magnetic lines cut across the winding copper coils 118 in a full circuit based on the revolutions per minute, an electric current is generated within the axle or coil spring of the scale 136 or other receiving device.

Figure 4:
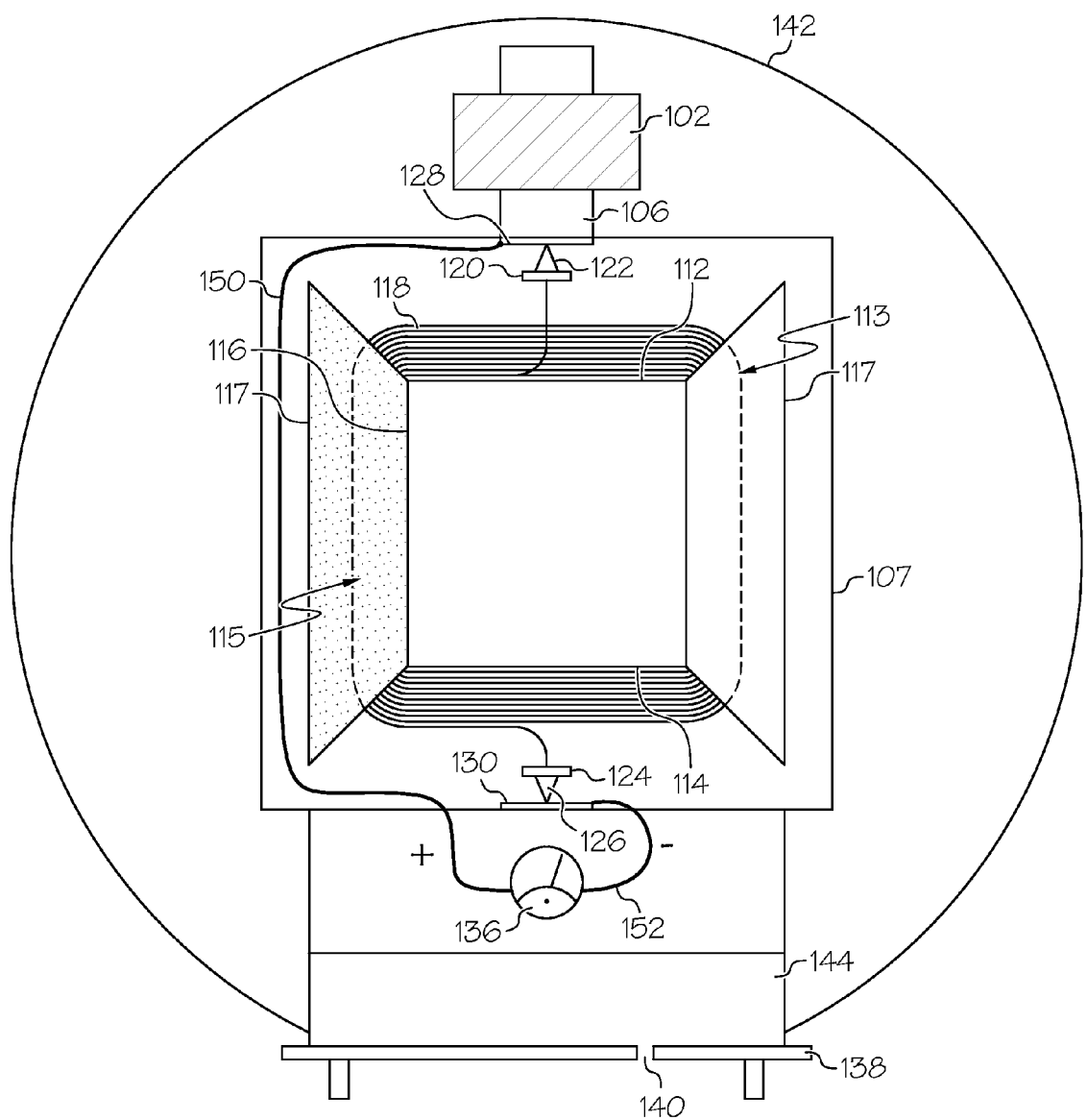
FIG. 4 is a front view of an embodiment of the present invention comprising a single magnet.

Referring now to FIG. 4, in another embodiment of the invention, only a single magnet is present (102)—Magnet 104 (shown in FIG. 1) is absent. All other elements of the generator remain the same. The coil 118, as it spins, cuts through the flux lines of the magnet 102, causing electrical current to be generated. It should be recognized that although the magnet is shown above the coil, the magnet 102 can be situated anywhere that, as the coil spins, the flux lines of the magnet 102 are crossed.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A solar generator, comprising a bulb encasement configured and disposed to maintain a partial vacuum therewithin, the bulb encasement comprising a coil frame armature disposed within a frame, a magnet disposed above the coil frame armature, the coil frame armature comprising a first needle engaged with a top of the frame, and a second needle engaged with a bottom of the frame, wherein the coil frame armature is configured in such a way as to, when the armature spins in response to light hitting wings attached to the frame, cut through magnetic flux lines of the magnet, thereby generating electricity.

2. The solar generator of claim 1, further comprising a holding device on which the magnet is embedded.

3. The solar generator of claim 1, wherein the top side of the coil frame armature comprises a first aluminum plate and the bottom side of the coil frame armature comprises a second aluminum plate.

4. The solar generator of claim 3, further comprising a set of wings positioned at interfaces of sides of the coil frame armature.

5. The solar generator of claim 1, further comprising a first needle connecting a first end of the coil to a copper plate, and a second needle attaching a second end of the coil to a second copper plate.

6. The solar generator of claim 5, further comprising a meter.

7. The solar generator of claim 6, further comprising a positive wire attaching the first copper plate to the meter, and a negatively charged wire attaching the second copper plate to the meter.

8. The solar generator of claim 1, further comprising a base.

9. The solar generator of claim 8, further comprising a stand situated under the base, the stand comprising a vacuum hole formed therewithin.

10. The solar generator of claim 1, wherein the magnet is a rare earth magnet.

11. The solar generator of claim 1, wherein the bulb encasement is clear so light can pass therethrough.

\* \* \* \* \*